(12) United States Patent
Morgan

(10) Patent No.: US 11,014,526 B1
(45) Date of Patent: May 25, 2021

(54) CHILD SAFETY HARNESS

(71) Applicant: Harvest Morgan, Birmingham, AL (US)

(72) Inventor: Harvest Morgan, Birmingham, AL (US)

( * ) Notice: Subject to any disclaimer, the term of this patent is extended or adjusted under 35 U.S.C. 154(b) by 0 days.

(21) Appl. No.: 16/525,838

(22) Filed: Jul. 30, 2019

(51) Int. Cl.
*B60R 22/10* (2006.01)
*B60R 22/14* (2006.01)

(52) U.S. Cl.
CPC ............ *B60R 22/105* (2013.01); *B60R 22/14* (2013.01)

(58) Field of Classification Search
CPC ....... B60R 22/105; B60R 22/14; B60R 22/12; B60R 22/10; B60R 22/00
USPC ......................................................... 297/467
See application file for complete search history.

(56) References Cited

U.S. PATENT DOCUMENTS

| 3,380,776 | A | * | 4/1968 | Dillender | ............... | B60R 22/105 |
| | | | | | | 297/484 |
| 3,791,694 | A | * | 2/1974 | Roberts | ................ | B60N 2/2806 |
| | | | | | | 297/250.1 |
| 5,063,879 | A | | 11/1991 | Vorbau | | |
| 5,074,588 | A | | 12/1991 | Huspen | | |
| 5,080,191 | A | * | 1/1992 | Sanchez | ............... | A47D 13/086 |
| | | | | | | 182/3 |
| 5,301,371 | A | * | 4/1994 | Chao | ................. | A41D 13/0007 |
| | | | | | | 2/102 |
| 5,540,403 | A | * | 7/1996 | Standley | ............... | B60R 22/105 |
| | | | | | | 24/579.11 |
| 5,660,445 | A | * | 8/1997 | Murray | ................. | A61F 5/3776 |
| | | | | | | 297/485 |
| 5,733,014 | A | * | 3/1998 | Murray | ................... | B60R 22/14 |
| | | | | | | 297/465 |
| 6,009,839 | A | * | 1/2000 | Kohn | ................... | A47D 13/086 |
| | | | | | | 119/770 |
| 6,364,417 | B1 | | 4/2002 | Silverman | | |
| 6,820,902 | B2 | * | 11/2004 | Kim | ..................... | A41D 13/018 |
| | | | | | | 280/748 |
| 6,902,193 | B2 | * | 6/2005 | Kim | ..................... | A41D 13/018 |
| | | | | | | 280/748 |
| 7,131,703 | B1 | * | 11/2006 | Sheridan | ............... | B60R 22/105 |
| | | | | | | 297/465 |
| 7,350,788 | B2 | * | 4/2008 | Booker | ................... | B62B 3/144 |
| | | | | | | 280/33.992 |
| 7,510,246 | B2 | * | 3/2009 | Gruninger | ............... | B60R 22/00 |
| | | | | | | 297/485 |

(Continued)

*Primary Examiner* — Mark R Wendell
(74) *Attorney, Agent, or Firm* — Sanchelima & Associates, P.A.; Christian Sanchelima; Alexander Rodriguez

(57) ABSTRACT

A child safety harness for securing children to a seat of a vehicle is disclosed herein. The child safety harness comprises a pair of shoulder straps, a torso strap mounted to the pair of shoulder straps, and a back strap mounted to the pair of shoulder straps and the torso strap. As a result, the child safety harness can fit all children and relieves the discomfort caused by other harnesses. The child safety harness comprises a connector provided at the back strap. The connector allows the child safety harness to be easily removable from the seat of the car. The connector is used to mount the child safety harness to the seat belt via the back strap to secure the child to the seat of the vehicle. In one embodiment, the child safety harness is adapted to strap multiple children through the use of one lap belt and shoulder belt.

9 Claims, 4 Drawing Sheets

(56) References Cited

U.S. PATENT DOCUMENTS

| | | | |
|---|---|---|---|
| 8,210,617 B2 * | 7/2012 | Aaron ................... | B60N 2/2866 297/484 |
| 8,794,709 B2 * | 8/2014 | Kennedy .............. | B60N 2/2812 297/485 |
| 9,884,604 B2 | 2/2018 | Hulitt | |
| 2003/0173817 A1 * | 9/2003 | Vits ......................... | B60R 22/12 297/484 |
| 2007/0040441 A1 * | 2/2007 | Boyle ................... | B60N 2/2866 297/467 |
| 2012/0019043 A1 * | 1/2012 | Merrill .................... | B60R 22/14 297/484 |
| 2019/0315307 A1 * | 10/2019 | Macaluso ............. | B60R 22/001 |

* cited by examiner

CHILD SAFETY HARNESS

BACKGROUND OF THE INVENTION

1. Field of the Invention

The present invention generally relates to safety devices. More specifically, the present invention relates to a child safety harness that is mounted to an existing seat belt, the child safety harness used for securing children to a seat in a vehicle.

2. Description of the Related Art

It is known that seats provided in a vehicle come with seat belts. The vehicle may include, but not limited to, a car, truck, bus, aircraft and other vehicles including ships. As known, the seat belts include a shoulder belt and/or a lap belt. The seat belts help passengers in the vehicle to strap themselves to the seat. The seat belts protect the passengers from falling off the seat at the time of sudden deceleration or impact of the vehicle. Although the seat belts help passengers to protect themselves, they are not suitable for strapping children. This is because; the existing seat belts are not suitable for the children due to their size and configuration and as a result cause the child to be thrown away from the seat upon rapid deceleration or impact of the vehicle.

In order to overcome the problems with the existing seat belts, infant/child safety seats and harnesses are used in the vehicles for strapping young children to the seat. Several designs of the child safety seats and harnesses used for strapping young children to the seat are disclosed in the past.

One such example is disclosed in a U.S. Pat. No. 9,884,604. In U.S. Pat. No. 9,884,604B2, it is disclosed that a child safety harness assembly for securing a child in a vehicle includes a first strap that has a midsection. The midsection is curved, such that opposing side sections of the strap extend in substantial parallelism from the midsection. Each of a pair of second straps is coupled to and extends between the opposing side sections. The second straps are substantially evenly spaced between the midsection and opposing ends of the first strap. A third strap has a first endpoint that is coupled to the midsection equally distant from the opposing ends of the first strap. Each of a set of three couplers is coupled singly to the opposing ends and the third strap. The second straps and the third strap are length adjustable. The couplers are configured to couple to anchors of the vehicle to couple the child to the vehicle.

Another example is disclosed in a U.S. Pat. No. 5,074,588. In U.S. Pat. No. 5,074,588A, it is disclosed that a child safety restraint for a vehicle seat having a safety belt includes a stress plate having at least one safety belt slot for receiving the safety belt to secure the restraint to the seat. Additionally, at least one harness slot and a harness for releasably securing a wearer's back to the stress plate, the harness including a pair of shoulder straps and a crotch strap secured at one end to the shoulder straps is disclosed. The shoulder straps are configured to each pass through a respective harness slot in the plate so that the harness is slidably engaged on the plate.

Yet another example is disclosed in a U.S. Pat. No. 6,364,417. In U.S. Pat. No. 6,364,417B1, it is disclosed that a safety harness having a chest strap received over a user's shoulders, a crotch strap received between a user's legs and selectively attachable to the chest strap. Additionally, a back panel received against a user's back, the back panel being interposed between the crotch strap and chest strap is disclosed. The back panel is substantially the width of the user's shoulders and the height of the user's torso to evenly disperse and dissipate forces from sudden movements acted upon a user when the harness is secured to a vehicular seatbelt.

Yet another example is disclosed in a U.S. Pat. No. 5,063,879. In U.S. Pat. No. 5,063,879A, it is disclosed that an apparatus for holding a child on the lap of an adult while traveling in a moving vehicle. The apparatus generally comprises a body-surrounding means, such as a harness, strap, vest, torso band, woven member, fabric belt, or other structure positionable about the body of a child and attachable to some stationarily anchored member or portion of the vehicle. In a preferred embodiment, the body surrounding means is attachable to a standard lap seat belt, such as those provided to adult passengers on commercial airliners.

Although the child safety seats and harnesses discussed above are capable of securing a child to a seat in a vehicle, they have several disadvantages. For instance, due to their structure, active and/or bored children may find the child safety seats and harnesses discussed above to be too restrictive and the resent the idea of being forced to use the child safety seats and harnesses. Further, some of the child safety seats and harnesses are permanently mounted to the existing seats or seat belts even when the children are not riding in the car. As a result, it may cause inconvenience to adult passengers when they sit on the seats. Furthermore, the child safety seats and harnesses discussed above take considerable time to install i.e., put on the child or extract the child in case of an emergency.

Other documents describing the closest subject matter provide for a number of more or less complicated features that fail to solve the problem in an efficient and economical way. None of these patents suggest the novel features of the present invention. Specifically, none of the inventions in the art disclose a child safety harness that is mounted to an existing vehicle safety belt, which is easy to install i.e., put on the child or extract the child in case of an emergency.

Therefore, there is a need to provide a child safety harness that is mounted to an existing vehicle safety belt, in which the child safety harness can be used to secure a child to a seat, easy to install and remove from the seat or seat belt.

SUMMARY OF THE INVENTION

It is one of the objects of the present invention to provide a child safety harness for securing children to a seat of a vehicle and that avoids the drawbacks of the prior art.

It is another one object of the present invention to provide a child safety harness that can be easily removed and secured to an existing lap belt and shoulder belt for securing a child to a seat of a vehicle through the back strap of the present invention.

It is still another object of the present invention to provide a child safety harness that is comfortable to children of different ages by using a pair of shoulder straps, torso strap, back strap, and crotch strap being secured to the child.

It is an object of the present invention to provide a child safety harness for securing multiple children to a seat of a vehicle through the use of one lap belt and shoulder belt.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present invention discloses a child safety harness for securing children to a seat of a vehicle. The child safety harness comprises a pair of shoulder straps, a torso strap mounted to the pair of shoulder straps, and a back strap mounted to the pair of shoulder straps and the torso strap. The child safety harness comprises a crotch strap mounted to the torso strap and the back strap. The child safety harness comprises a connector provided at the back strap. The pair of shoulder straps, the torso strap, the back strap and the crotch strap are positioned over a child and strapped. A lap belt and shoulder belt of a vehicle is mounted to a seat. The connector is used to mount the child safety harness to the lap belt and shoulder belt via the back strap for securing the child to the seat of the vehicle.

Various features and embodiments of a child safety harness for securing children to a seat of a vehicle are explained in conjunction with the description of FIGS. 1-6.

Figure 1:
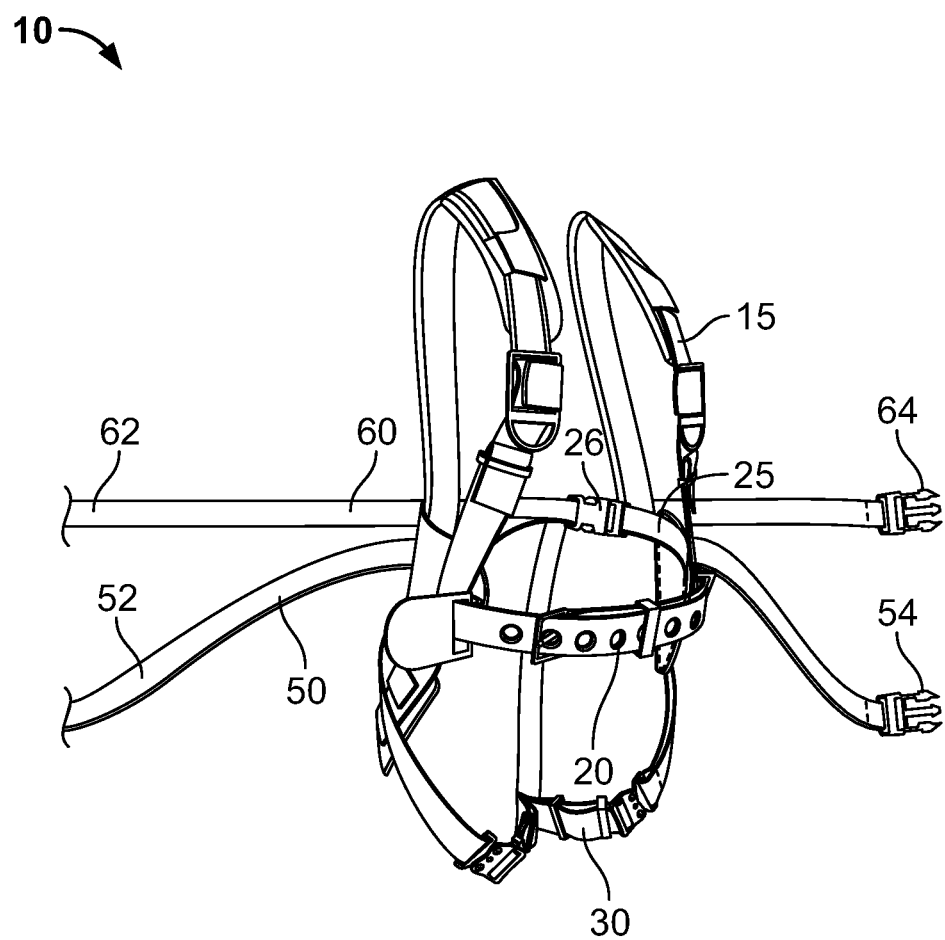
FIG. 1 illustrates a perspective view of a child safety harness 10, in accordance with one embodiment of the present invention.
Figure 2:
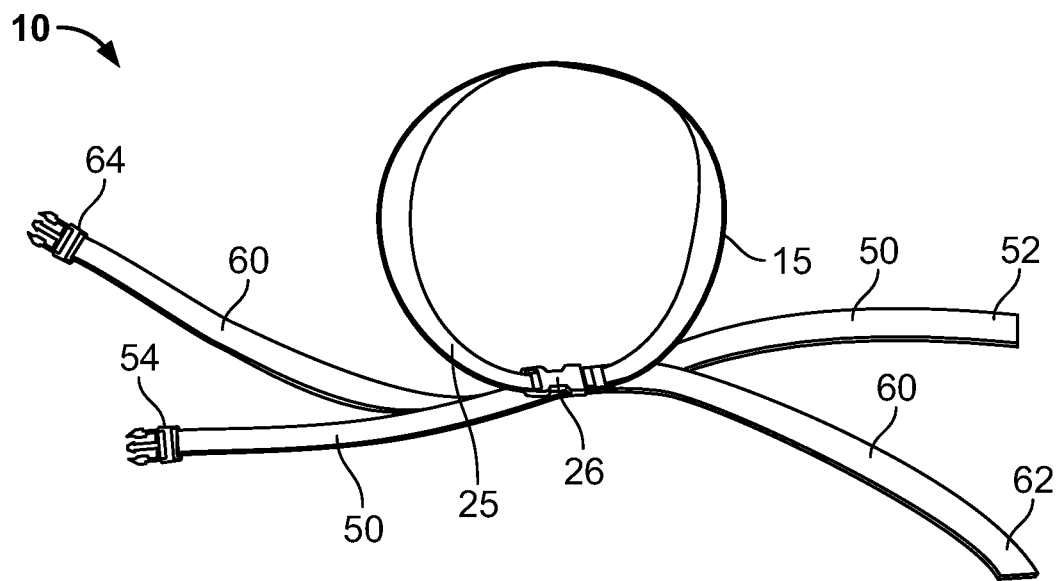
FIG. 2 illustrates a top view of the child safety harness 10 in which a lap belt 50 and a shoulder belt 60 are mounted to a back strap 25 of the child safety harness 10, in accordance with one embodiment of the present invention.

Referring to FIGS. 1 and 2, a perspective view and a top view, respectively of a child safety harness 10 to be used in a vehicle for securing a child to a seat is shown, in accordance with one embodiment of the present invention. The child safety harness 10 comprises a pair of shoulder straps 15. The child safety harness 10 further comprises a torso strap 20 mounted to the pair of shoulder straps 15. Further, the child safety harness 10 comprises a back strap 25 mounted to the pair of shoulder straps 15 and the torso strap 20.

Figure 3:
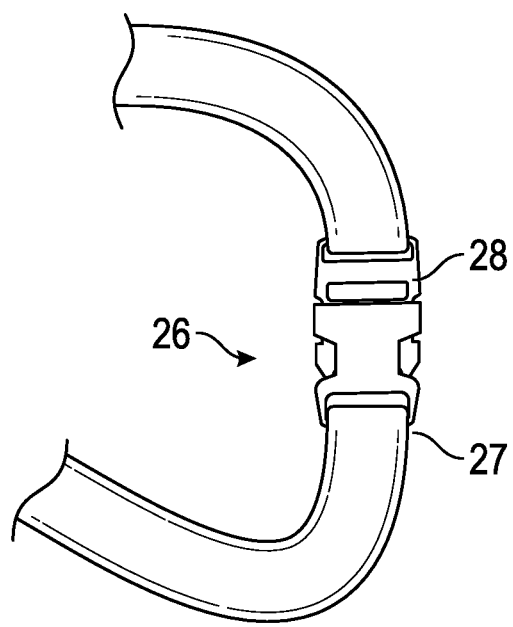
FIG. 3 illustrates a connector 26 used for mounting the child safety harness 10 to a lap belt 50 and a shoulder belt 60, in accordance with one embodiment of the present invention.

Further, the child safety harness 10 comprises a connector 26 indicative of a strap such as a buckle at the back strap 25. Referring to FIG. 3, the connector 26 is shown. As can be seen, the connector 26 may comprise a male connector 27 and a female connector 28. It should be understood that the male connector 27 and the female connector 28 are mounted to connect the connector 26 to other objects. In the current embodiment, the connector 26 is provided at the back strap 25 to mount the back strap 25 to a lap belt 50 and a shoulder belt 60.

As can be seen from FIG. 1, the child safety harness 10 comprises a crotch strap 30 mounted to the torso strap 20 and the back strap 25. As known, a seat (not shown) of a vehicle (not shown) comprises the lap belt 50. The lap belt 50 comprises a free end 52 at one end and a buckle 54 at the other end. Further, the seat comprises the shoulder belt 60. The shoulder belt 60 comprises a free end 62 and a buckle 64. It should be understood that the buckle 54 of the lap belt 50 and the buckle 64 of the shoulder belt 60 might indicate a respective male buckle. As known, the free end 52 of the lap belt 50 and free end 62 of the shoulder belt 60 are mounted to the seat such that buckle 54 of the lap belt 50 and the buckle 64 of the shoulder belt 60 are mounted to the seat to fasten the lap belt 50 and the shoulder belt 60 to the seat.

It should be understood that the lap belt 50 and the shoulder belt 60 are typical seat belts that come in vehicles. In the current embodiment, the lap belt 50 and the shoulder belt 60 are threaded through the back strap 25 with the help of the connector 26, as shown in FIG. 1. It should be understood that the FIGS. 1 to 3 are shown to illustrate that the child safety harness 10 is used for securing one child to the seat or the seat belt. In order to secure the child, at first, the pair of shoulder straps 15 is positioned over the shoulders of the child. When the pair of shoulder straps 15 is positioned over the shoulders, the torso strap 20 comes over the torso area of the child and the back strap 25 comes over back i.e., spine area of the child. Further, the crotch strap 30 is extended under the crotch and between the legs of the child. The crotch strap 30 is mounted to the torso strap 20 and the back strap 25. It should be understood that each of the shoulder straps 15, the torso strap 20, the crotch strap 30 and the back straps 25 are mounted for example using a buckle to enable rapid and uncomplicated release of the child from the child safety harness 10. Alternatively, any suitable type(s) of buckle(s) or closure mechanism(s) may be employed to mount the shoulder straps 15, the torso strap 20, the crotch strap 30 and the back straps 25 to enable rapid and uncomplicated release of the child from the child safety harness 10.

In the current embodiment, the lap belt 50 and the shoulder belt 60 are mounted to the back strap 25 with the help of the connector 26. In order to mount the lap belt 50 and the shoulder belt 60 to the back strap 25, the male connector 27 of the connector 26 is inserted into the female connector 28 of the connector 26. The connector 26 when joined or buckled, is sufficiently sturdy to endure any foreseeable inertial or strain placed on the connector 26 such that the connector 26 ensures the child safety harness 10 is mounted to the lap belt 50 and the shoulder belt 60 via the back strap 25 during sudden deceleration or impact of the vehicle.

Figure 4:
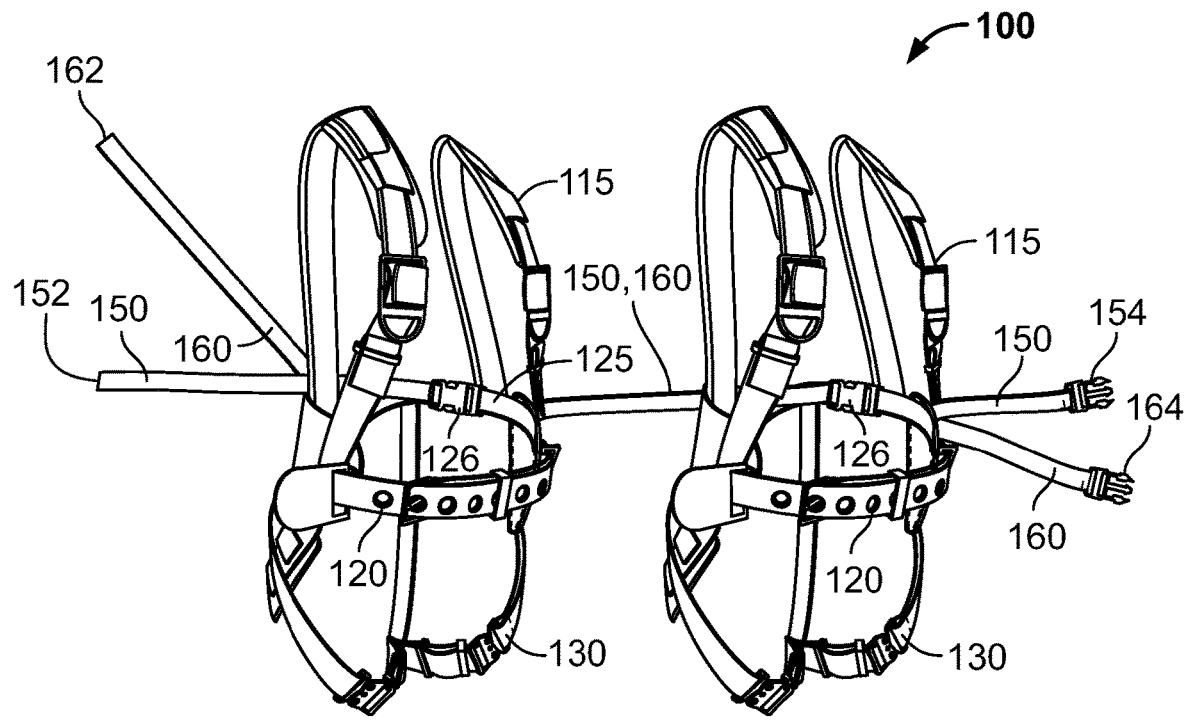
FIGS. 4 and 5 illustrate a perspective view and a top view of a child safety harness 100, respectively, in accordance with another embodiment of the present invention.
Figure 5:
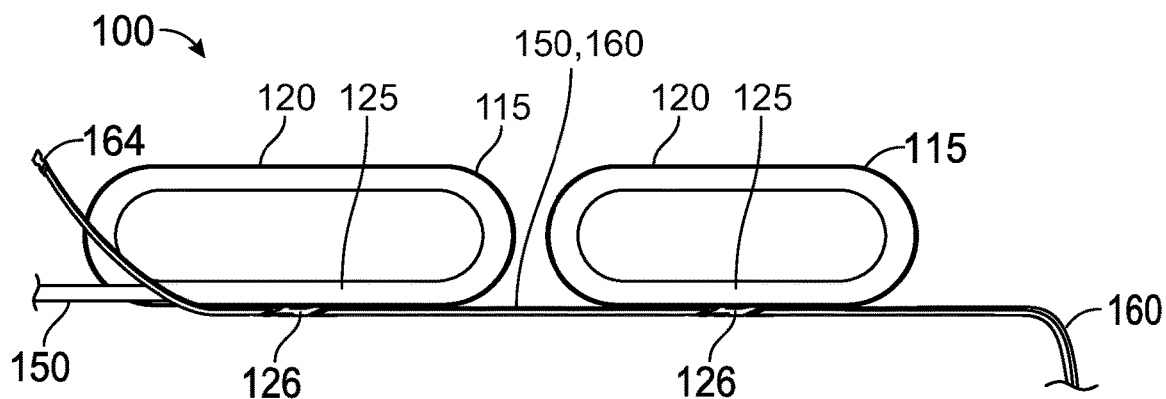
Figure 6:
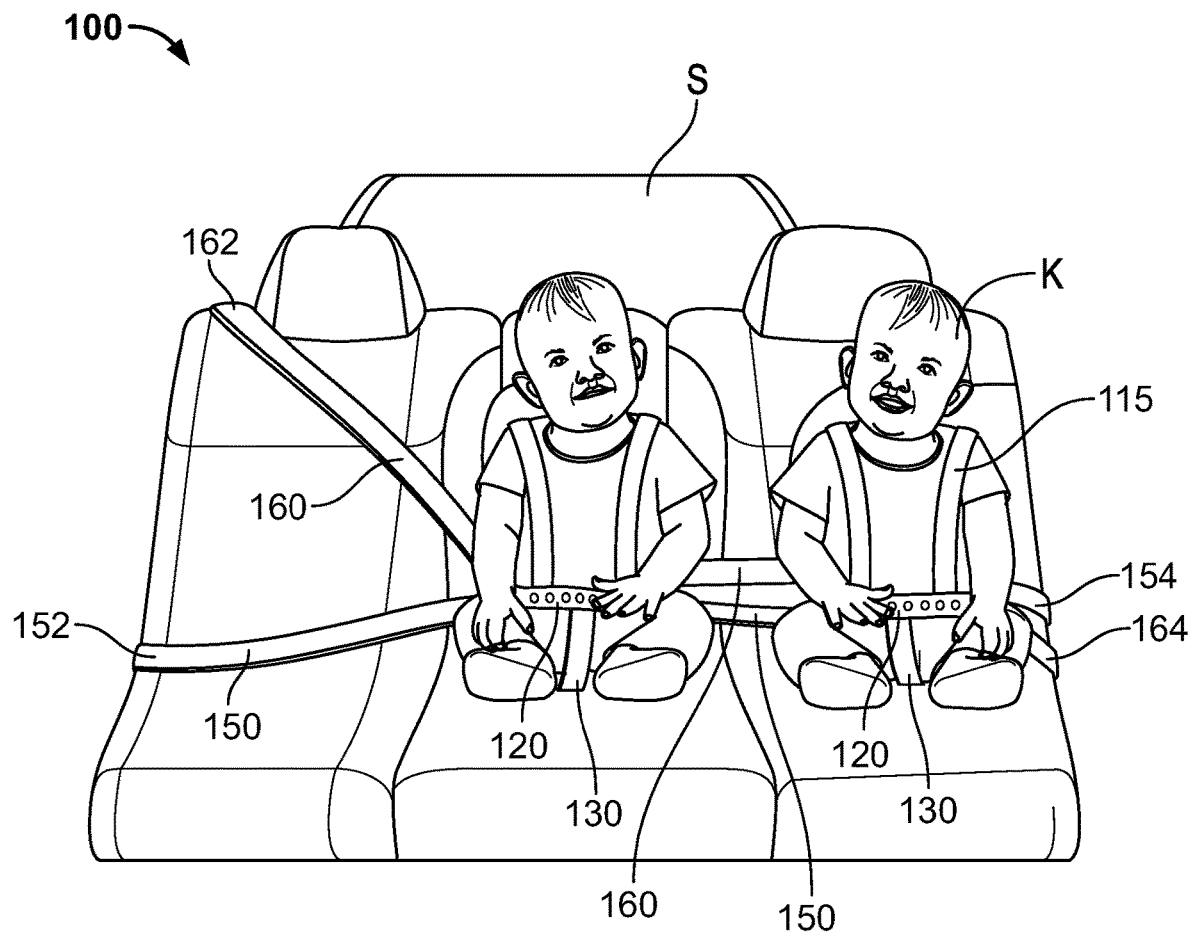
FIG. 6 illustrates the child safety harness 100 used to secure children K to the lap belt 150 and a shoulder belt 160, in accordance with one embodiment of the present invention.

Now referring to FIGS. 4 to 6, a child safety harness 100 used in a vehicle for securing a child to a seat or seat belt are shown, in accordance with another embodiment of the present invention. FIG. 4 and FIG. 5 show a perspective view and a top view of the child safety harness 100, respectively. The child safety harness 100 comprises shoulder straps 115. In the current embodiment, the shoulder straps 115 include two pairs of shoulder straps 115 as shown in FIG. 4 and FIG. 5. It should be understood that the two pairs of shoulder straps 115 is used to secure two children at a time. However, it should be understood that the child safety harness 100 might also be used to secure three or more children to the seat and/or seat belt. As such, three or more pairs of shoulder straps 115 might be provided to secure three or more children to the seat and/or seat belt.

The child safety harness 100 further comprises a pair of torso straps 120, each mounted to the respective pair of shoulder straps 115. Further, the child safety harness 100 comprises a pair of back straps 125; each mounted to the respective pair of shoulder straps 115 and the respective torso straps 120. Further, the child safety harness 100 comprises connectors 126 (similar to connector 26 shown in FIG. 3) indicative of a strap such as a buckle at the back straps 125.

As can be seen from FIG. 4, the child safety harness 100 comprises a pair of crotch straps 130, each mounted to the respective torso straps 120 and the respective back straps 125. Further, the child safety harness 100 comprises a lap belt 150 that comes with a seat S (shown in FIG. 6) of a vehicle (not shown) as known in the art. The lap belt 150 comprises a free end 152 at one end and a buckle 154 at the other end. Further, the seat S comprises a shoulder belt 160. The shoulder belt 160 comprises a free end 162 and a buckle 164. As known, one end of the lap belt 150 and one end of the shoulder belt 160 is mounted to the seat S, as such in the current embodiment, the free end 152 of the lap belt 150 and the free end 162 of the shoulder belt 160 are mounted to the seat using known mechanism.

Now referring to FIG. 6, the child safety harness 100 used to secure children K to the lap belt 150 and the shoulder belt 160 is shown, in accordance with a preferred embodiment of the present invention. In order to place the child safety harness 100 on the children K, the two pairs of shoulder straps 115, in which each pair of the shoulder straps 115 is placed over the shoulders of children K. When the pair of shoulder straps 115 are positioned over the shoulders, the torso straps 120 comes over the torso area of children K and the back straps 125 comes over the back i.e., spine area of children K. Further, each of the crotch straps 130 is extended under the crotch and between the legs of children K. The crotch straps 130 is mounted to the respective torso straps 120 and the respective back straps 125. It should be understood that each pair of the shoulder straps 115, the torso straps 120, the crotch straps 130 and the back straps 125 are mounted for example using a buckle to enable rapid and uncomplicated release of the child from the child safety harness 100. Alternatively, any suitable type(s) of buckle(s) or closure mechanism(s) may be employed to mount the pair of shoulder straps 115, the torso straps 120, the crotch straps 130 and the back straps 125.

After mounting the pair of shoulder straps 115, the torso straps 120, the crotch straps 130 and the back straps 125 over children K, the children K are made to sit on the seat S. It should be understood that seat S might indicate a front seat or rear seat of a vehicle. The vehicle may include, but not limited to, a car, truck, bus, aircraft and other vehicles including ships. After making the children K to sit on the seat S, the seat belts i.e., the lap belt 150 and the shoulder belt 160 are drawn through the back straps 125 provided to children K. In other words, the lap belt 150 and the shoulder belt 160 go through the back or adjacent to the back straps 125. When the lap belt 150 and the shoulder belt 160 go through the back of the back straps 125, the connectors 126 provided at the respective back straps 125 is used to firmly mount the back straps 125 to the lap belt 150 and the shoulder belt 160. After mounting the lap belt 150 and the shoulder belt 160 to back straps 125, the lap belt 150 and the shoulder belt 160 are mounted or locked to the seat S as known in the prior art. That is, the lap belt 150 and the shoulder belt 160 are buckled to the seat S, similar to seat belt used to secure an adult passenger.

It should be understood that the connectors 126 provided at back straps 125 ensures that the lap belt 150 and the shoulder belt 160 are firmly mounted to the back straps 125. As a result, the child safety harness 100 ensures that the children K are firmly secured to the seat S with the help of the lap belt 150 and the shoulder belt 160 of the vehicle. As the child safety harness 100 ensures that the children K are removably mounted to the lap belt 150 and the shoulder belt 160 with the help of the connectors 126, the children K are strapped to the seat S and are protected from falling off the seat at the time of sudden deceleration or impact of the vehicle.

It should be understood that each of the straps such as the shoulder straps 115, the torso straps 120, the back straps 125 and the crotch straps 130 is capable of being adjusted in length. As such, an adult passenger can adjust the length of each of the shoulder straps 115, the torso straps 120, the back straps 125 and the crotch straps 130 such that the child safety harness 100 can be used to secure children K of different ages to the seat S.

In order to remove the child safety harness 100 from the seat belts i.e., the lap belt 150 and the shoulder belt 160, the adult passenger may demount the connectors 126 such that the back straps 125 of the child safety harness 100 are released from the seat belts. Subsequently, the adult passenger may demount the buckles provided at the shoulder straps 115 or the torso straps 120 or the back straps 125 or the crotch straps 130. After removing the child safety harness 100, the adult passenger may store the child safety harness 100 in a boot space of the vehicle. Based on the above, it should be understood that the child safety harness 100 is easy to install or to remove from the child K.

Although it is explained that the straps such as the shoulder straps 115 or the torso straps 120 or the back straps 125 or the crotch straps 130, and the seat belts such as lap belt 150 and the shoulder belt 160 are provided with a buckle to enable rapid and uncomplicated install or release of the child K from the child safety harness 100, it should be understood that any suitable type(s) of buckle(s) or closure mechanism(s) including, but not limited to hook-and-loop, buttons, clasps, and snaps may be employed to secure the children K to the seat belts of the vehicle using the child safety harness 100.

Based on the above, it is evident that the child safety harness can be used with existing seat belts present in the vehicle. Alternatively, the child safety harness may also be provided as an accessory with a new vehicle in that the passengers can mount the child safety harness to the seat belts whenever they need to take a child for a ride in the vehicle.

Although it is explained that the child safety harness is secured to the lap belt and the shoulder belt first and then the seat belts are secured to the seat of the vehicle, it should be understood that it is possible to mount the seat belts to the seat first and then mount the child safety harness to the seat belts using the connector provided at the back strap.

In one alternate embodiment, the back strap may be provided with an aperture to receive the lap belt and the shoulder belt. In such embodiment, the back strap is not provided with the connector as explained above. However, the lap belt and the shoulder belt are received in the aperture provided at the back strap of the child safety harness to mount the seat belt to the child safety harness.

In one preferred embodiment, the child safety harness is made of any suitable high tensile strength, non-stretchable woven belt material surrounded by relatively high-density foam, such as thermoplastic foam, substantially enclosed by an attractive fabric cover with the belt encased in the foam providing the tensile strength for physical restraint of the child.

The drawings shown herein are provided for illustrative purpose only, and shape and size of each components illustrated should not be construed in limited sense. A person skilled in the art will appreciate that components may be added or deleted to incorporate additional features described in the present invention and even such inventions will be within the scope of the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A child safety harness, the child safety harness comprising:
    a pair of shoulder straps including a first strap and a second strap, wherein said first strap is parallel to said second strap;
    a torso strap, wherein said first strap and said second strap are mounted in abutting engagement with said torso strap, said torso strap including a plurality of openings extending therethrough, said plurality of openings being evenly spaced apart and extending horizontally along a partial length of said torso strap, said plurality of openings being parallel to each other;
    a back strap, wherein said first strap and said second strap are mounted in abutting engagement with said back strap;
    a crotch strap mounted to the torso strap and the back strap, said crotch strap further defined by a first crotch strap portion, a second crotch strap portion and a rear crotch strap portion which are interconnected together, said rear crotch strap portion extending from said first crotch strap portion and said second crotch strap portion towards said back strap thereby defining a first loop and a second loop on lateral sides of said rear crotch strap portion, said first loop and said second loop each adapted to receive a leg of a user therethrough, said first loop and second loop being adjacent to each other and separated by said rear crotch strap portion; and
    a connector provided at the back strap, wherein the pair of shoulder straps, the torso strap, the back strap and the crotch strap are capable of being positioned over a child and strapped;
    a lap belt and a shoulder belt of a vehicle, wherein said lap belt includes a first end and a second end, wherein said first end of said lap belt is a free end, wherein said second end of said lap belt includes a buckle, wherein said shoulder belt includes a first end and a second end, wherein said first end of said shoulder belt is a free end, wherein said second end of said shoulder belt includes a buckle, wherein said each of said lap belt and shoulder belt are threaded through said back strap adapted to secure a child to a seat of the vehicle.

2. The child safety harness of claim 1, wherein the connector comprises a male connector and a female connector.

3. The child safety harness of claim 1, wherein said pair of shoulder straps is capable of being positioned over the shoulders of a child.

4. The child safety harness of claim 1, wherein said torso strap is capable of being placed over a torso area of a child and said back strap comes over the child's back.

5. The child safety harness of claim 1, wherein said crotch strap is capable of being extended under the crotch and between the legs of the child.

6. The child safety harness of claim 1 wherein said torso strap includes at least seven of said plurality of openings.

7. The child safety harness of claim 1 wherein said lap belt and said shoulder belt overlap when threaded through said back strap.

8. The child safety harness of claim 1, wherein said rear crotch strap portion being in abutting contact with said first loop and said second loop, simultaneously.

9. A child safety harness, the child safety harness consisting of:
    a pair of shoulder straps including a first strap and a second strap, wherein said first strap is parallel to said second strap;
    a torso strap, wherein said first strap and said second strap are in abutting engagement with said torso strap, said torso strap including a plurality of openings extending therethrough, said plurality of openings being evenly spaced apart and extending horizontally along a partial length of said torso strap, said plurality of openings being parallel to each other;
    a back strap, wherein said back strap is mounted to said torso strap, said first strap and said second trap being in abutting engagement with said back strap;
    a crotch strap mounted to the torso strap and the back strap, said crotch strap further defined by a first crotch strap portion, a second crotch strap portion and a rear crotch strap portion which are interconnected together, said rear crotch strap portion extending from said first crotch strap portion and said second crotch strap portion towards said back strap thereby defining a first loop and a second loop on lateral sides of said rear crotch strap portion, said first loop and said second loop each adapted to receive a leg of a user therethrough, said first loop and second loop being adjacent to each other and separated by said rear crotch strap portion; and
    a connector provided at the back strap, wherein the pair of shoulder strap, the torso strap, the back strap and the crotch straps are capable of being positioned over a child and strapped, wherein said connector includes a male member and a female member; and
    a vehicle, a lap belt and a shoulder belt of the vehicle, wherein said lap belt includes a first end and a second end, wherein said first end of said lap belt is a free end, wherein said second end of said lap belt includes a buckle, wherein aid shoulder belt includes a first end and a second end, wherein said first end of said shoulder belt is a free end, wherein said second end of said shoulder belt includes a buckle, wherein each of said buckle of said lap belt and said shoulder belt is a three pronged buckle, wherein said lap belt and said shoulder belt is threaded through said back strap, said lap belt and said shoulder belt overlapping each other when threaded through said back strap.

* * * * *